United States Patent
Park

(10) Patent No.: US 7,496,380 B2
(45) Date of Patent: Feb. 24, 2009

(54) UNIVERSAL ASYNCHRONOUS RECEIVER/TRANSMITTER CIRCUIT FOR MOBILE TELECOMMUNICATION TERMINAL

(75) Inventor: Won Hyung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 737 days.

(21) Appl. No.: 11/114,306

(22) Filed: Apr. 25, 2005

(65) Prior Publication Data

US 2005/0239515 A1    Oct. 27, 2005

(30) Foreign Application Priority Data

Apr. 27, 2004    (KR) .................... 10-2004-0029007

(51) Int. Cl.
*H04B 1/38* (2006.01)
*H04B 7/00* (2006.01)

(52) U.S. Cl. .................. 455/557; 455/550.1; 455/556.1

(58) Field of Classification Search ................ 455/557, 455/569.1, 550.1, 556.1, 502; 370/511, 512, 370/503, 310

See application file for complete search history.

(56) References Cited

U.S. PATENT DOCUMENTS

| | | | |
|---|---|---|---|
| 5,953,674 A | | 9/1999 | Hutchinson, IV |
| 6,317,425 B1 * | | 11/2001 | Kim ........................... 370/350 |
| 6,581,100 B1 * | | 6/2003 | Durin et al. .................. 709/230 |
| 2003/0144040 A1 | | 7/2003 | Liu et al. |

FOREIGN PATENT DOCUMENTS

| | | |
|---|---|---|
| CN | 1261506 | 7/2000 |
| EP | 1596 306 A2 | 11/2005 |
| KR | 1020020080186 A | 10/2002 |
| WO | WO 02/088973 A1 | 11/2002 |

* cited by examiner

*Primary Examiner*—Sonny Trinh
(74) *Attorney, Agent, or Firm*—Lee, Hong, Degerman, Kang & Waimey

(57) ABSTRACT

A universal asynchronous receiver/transmitter (UART) circuit for a mobile telecommunication terminal is disclosed. In one embodiment, the UART circuit includes a first universal asynchronous receiver/transmitter (UART1) and a second universal asynchronous receiver/transmitter (UART2) coupled to a processor, configured to receive and transmit data between the mobile telecommunication terminal and an external device. The UART circuit also includes a hands-free functional part coupled to the processor, configured to perform signal processing. The UART circuit also includes a multiplexer coupled to the hands-free functional part and the UART2 at respective receiving and transmitting ends, configured to perform switching operations based on at least one control signal transmitted from the processor. The UART circuit also includes a multi-pin receptacle coupled to the multiplexer, configured to interface with the external device. The present invention enables the multi-pin receptacle and the two universal asynchronous receiver/transmitters to be used simultaneously.

10 Claims, 2 Drawing Sheets

UNIVERSAL ASYNCHRONOUS RECEIVER/TRANSMITTER CIRCUIT FOR MOBILE TELECOMMUNICATION TERMINAL

CROSS-REFERENCE TO RELATED APPLICATIONS

Pursuant to 35 U.S.C. § 119(a), this application claims the benefit of earlier filing date and right of priority to Korean Application No. 10-2004-0029007, filed on Apr. 27, 2004, the contents of which is hereby incorporated by reference herein in its entirety.

BACKGROUND OF THE INVENTION

1. Field of the Invention

The present invention relates generally to a mobile telecommunication terminal, and more particularly to a universal asynchronous receiver/transmitter circuit for a mobile telecommunication terminal.

2. Discussion of the Related Art

A related art mobile telecommunication terminal is coupled to a connection device, such as a 19-pin receptacle (receptacle), through a hands-free device or a data communication cable. The data communication cable connects a communication device (or a terminal) to a computer. The communication device connected to the computer may then serve as a wireless modem. Using such a connection, a user can communicate through wireless internet or wireless data communication.

FIG. 1 is a block diagram showing an example of a universal asynchronous receiver/transmitter circuit in a related art mobile telecommunication terminal.

Referring to FIG. 1, a mobile station modem (MSM) 110 is connected to a 19-pin receptacle 120. FIG. 1 shows signal processing between a hands-free functional part 111 and a first universal asynchronous receiver/transmitter (UART1) 112 of the mobile station modem 110 and the 19-pin receptacle 120.

The 19 pins of the receptacle 120 include 6 pins allotted to processing functions related to the hands-free mode. The processing functions related to the hands-free mode may include receiving hands-free audio signals (PCM RX), transmitting hands-free audio signals (PCM TX), a hands-free pulse code modulation clock (PCM CLOCK), a hands-free pulse code modulation synchronizing signal (PCM SYNC), a hands-free ring terminal (RING), and a hands-free mode identifying terminal (HANDS-FREE MODE). Furthermore, 7 pins are allotted for processing functions related to data communication. The processing functions related to data communication include receiving data (RXD), transmitting data (TXD), a ring indicator (RI), a data carrier detect (DCD), a ready for receiving (RFR), a clear to send (CTS), and a data terminal ready (DTR). Additionally, 6 pins are allotted terminals for performance of other functions, such as, supplying device power (POWER (4.2V)), supplying battery charging power (POWER (4.2V)), grounding power (POWER GROUND), which requires 3 terminals, and identifying external power (equal to or less than 3.3V).

To accommodate additional functions newly developed for mobile telecommunication terminals, simultaneous use of two universal asynchronous receiver/transmitters (UART) is desirable. However, if a related art 19-pin receptacle is used, two UARTs may not be used simultaneously because the 19-pin receptacle does not have an adequate number of pins to accommodate simultaneous use of both UARTs.

SUMMARY OF THE INVENTION

The present invention is directed to a universal asynchronous receiver/transmitter circuit for a mobile telecommunication terminal that addresses one or more problems of the related art.

In one embodiment, a universal asynchronous receiver/transmitter (UART) circuit for a mobile telecommunication terminal includes a first universal asynchronous receiver/transmitter (UART1) and a second universal asynchronous receiver/transmitter (UART2) coupled to a processor, configured to receive and transmit data between the mobile telecommunication terminal and an external device. The processor may be, for example, a mobile station modem (MSM). The dual UART circuit may preferably also include a hands-free functional part coupled to the processor, configured to perform signal processing. The dual UART circuit may preferably also include a multiplexer coupled to the hands-free functional part and the second universal asynchronous receiver/transmitter (UART2) at respective receiving and transmitting ends, configured to perform switching operations based on control signals transmitted from the processor. The dual UART circuit may preferably also include a 19-pin receptacle coupled to the multiplexer, configured to interface with the external device.

Based on the switching operations, a connection between the 19-pin receptacle and the hands-free functional part may be established. Alternatively, based on the switching operations, a connection between the 19-pin receptacle and the UART2 may be established.

The multiplexer may preferably include at least two pins to accommodate use by the hands-free functional part and the UART2. The UART1 and the UART2 may preferably be located in the processor. The hands-free functional part may also preferably be located in the processor. The multiplexer may preferably be formed between the processor and the 19-pin receptacle. The hands-free functional part may preferably be configured to perform signal processing in a hands-free device.

The present invention provides a dual universal asynchronous receiver/transmitter circuit for a mobile telecommunication terminal that enables a 19-pin receptacle and two universal asynchronous receiver/transmitters to be used simultaneously. The dual universal asynchronous receiver/transmitter (UART) circuit enables simultaneous use of first and second UARTs in conjunction with a 19-pin receptacle and two additional pins.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
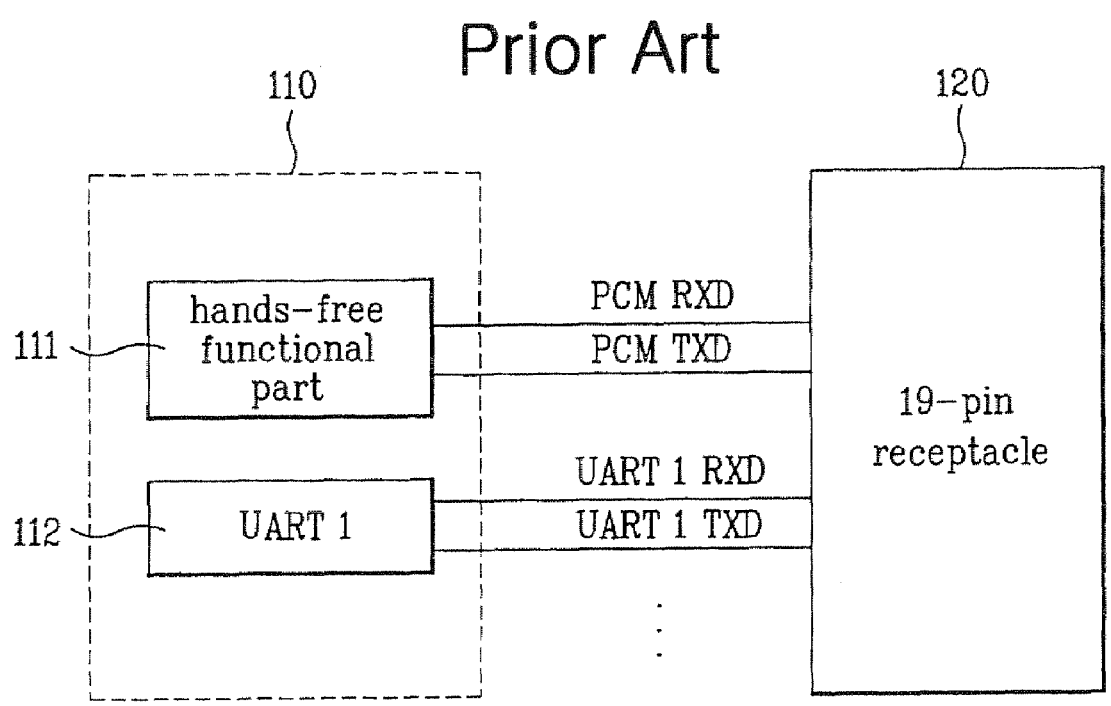
FIG. 1 is a block diagram showing an example of a universal asynchronous receiver/transmitter circuit in a related art mobile telecommunication terminal.
Figure 2:
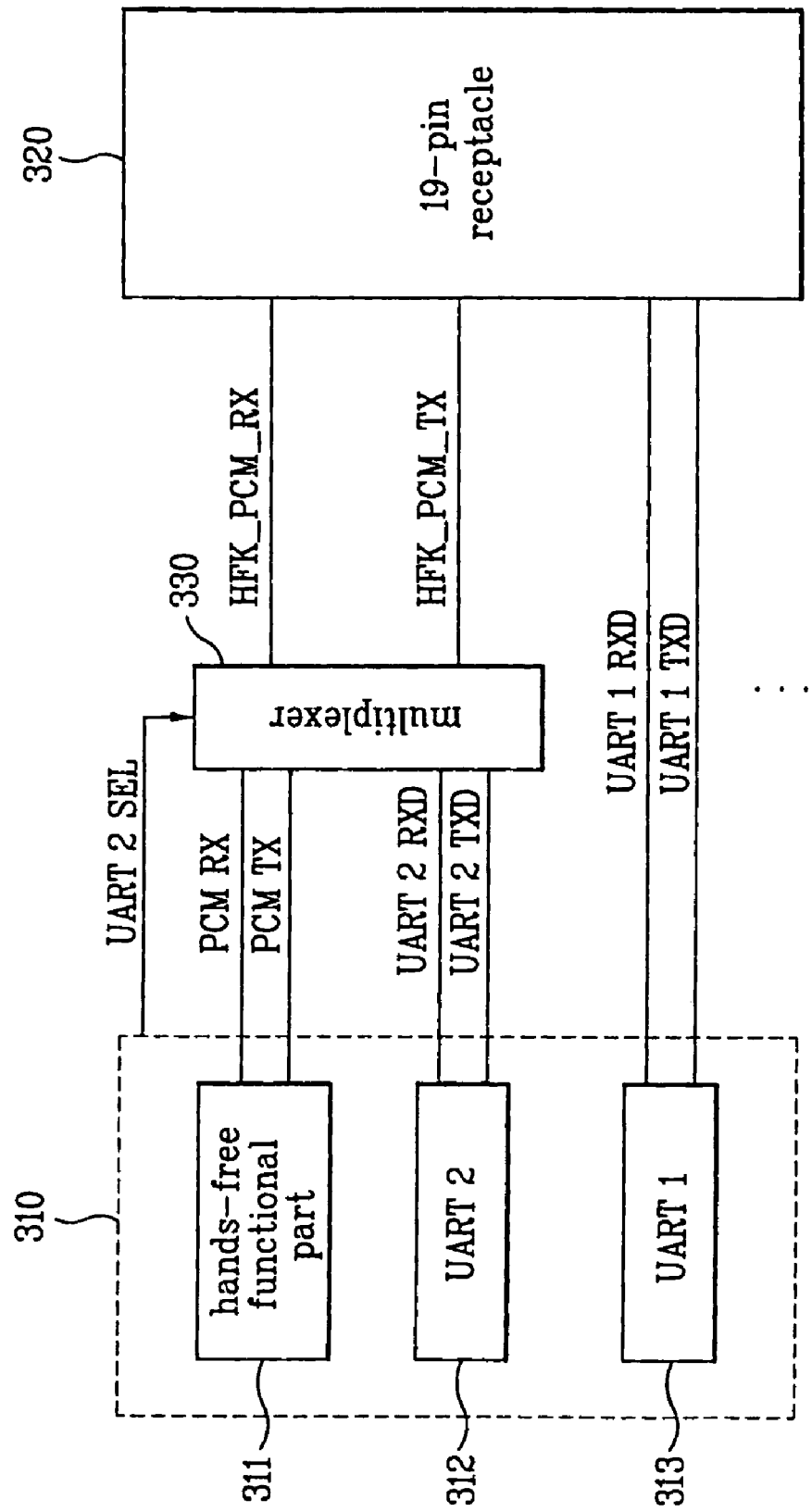
FIG. 2 is a block diagram of a universal asynchronous receiver/transmitter circuit for a mobile telecommunication terminal, according to one embodiment of the present invention.

FIG. 2 is a block diagram of a universal asynchronous receiver/transmitter (UART) circuit for a mobile telecommunication terminal, according to one embodiment of the present invention.

Referring to FIG. 2, the UART circuit is a dual UART circuit including a first universal asynchronous receiver/transmitter (UART1) 313 coupled to a 19-pin receptacle 320. Although a 19-pin receptacle is used, the present invention may also utilize other types of multi-pin receptacles, such as, for example, a 24-pin receptacle. The dual UART circuit also includes a second universal asynchronous receiver/transmitter (UART2) 312 and a hands-free functional part 311, coupled to the 19-pin receptacle 320 via a multiplexer 330. In one embodiment, the first universal asynchronous receiver/transmitter (UART1) 313 may be used as in a single UART circuit. Conversely, the second universal asynchronous receiver/transmitter (UART2) 312 may preferably be used in alternation with the hands-free functional part 311.

The UART1 313, the UART2 312, and the hands-free functional part 311 are coupled to a processor 310. The processor may be, for example, a mobile station modem (MSM) or other type of digital signal processor. The UART1 313, the UART2 312, and the hands-free functional part 311 may preferably be located in the processor 310.

The multiplexer 330 is coupled to the processor 310 and the 19-pin receptacle 320. The multiplexer 330 may preferably be coupled (formed) between the processor 310 and the 19-pin receptacle 320. More specifically, the multiplexer 330 may be coupled to the hands-free functional part 311 and the UART2 312 at respective receiving and transmitting ends.

The multiplexer 330 is configured to receive and transmit signals, such as PCM RX/PCM TX (hands-free audio signal receive/transmit) and/or UART2 RXD/UART2 TXD (UART2 data receive/transmit). A control signal (UART2 SEL) transmitted from the processor 310 is supplied to the multiplexer 330. The 19-pin receptacle 320 is coupled to the multiplexer 330 and the processor 310 in order to form an interface with an external device. The 19-pin receptacle 320 is configured to receive and transmit signals, such as for example, HFK_PCM_RX and HFK_PCM_TX.

The control signal (UART2 SEL) transmitted from the processor 310 selects an operation to be performed by the second universal asynchronous receiver/transmitter (UART2). In a preferred embodiment, the UART2 312 is not used simultaneously with the hands-free functional part 311. The multiplexer 330 performs switching operations based on the control signal (UART2 SEL). Depending on the switching state (based on the switching operations), a determination is made whether to connect the 19-pin receptacle 320 to the hands-free functional part 311 or to connect the 19-pin receptacle 320 to the UART2 312. The multiplexer 330 may preferably include at least two pins to accommodate use by the hands-free functional part 311 and the UART2 312.

In one embodiment, a dual universal asynchronous receiver/transmitter (UART) circuit for a mobile telecommunication terminal includes the first universal asynchronous receiver/transmitter (UART1) 313 and the second universal asynchronous receiver/transmitter (UART2) 312 coupled to the processor 310, configured to receive and transmit data between the mobile telecommunication terminal and an external device. The dual UART circuit also includes the hands-free functional part 311 coupled to the processor 310, configured to perform signal processing. The dual UART circuit may also include the multiplexer 330 coupled to the hands-free functional part 311 and the second universal asynchronous receiver/transmitter (UART2) 312 at respective receiving and transmitting ends, configured to perform switching operations based on at least one control signal transmitted from the processor 310. The dual UART circuit may also include a multi-pin receptacle, such as the 19-pin receptacle 320, coupled to the multiplexer 330, configured to interface with the external device.

Based on the switching operations, a connection between the 19-pin receptacle 320 and the hands-free functional part 311 may be established. Alternatively, based on the switching operations, a connection between the 19-pin receptacle 320 and the UART2 312 may be established.

The multiplexer 330 may preferably include at least two pins to accommodate use by the hands-free functional part 311 and the UART2 312. The UART1 313 and the UART2 312 may preferably be located in the processor 310. The hands-free functional part 311 may also preferably be located in the processor 310. The multiplexer 330 may preferably be formed between the processor 310 and the 19-pin receptacle 320. The hands-free functional part 311 may preferably be configured to perform signal processing in a hands-free device.

The present invention provides a dual universal asynchronous receiver/transmitter circuit for a mobile telecommunication terminal that enables a 19-pin receptacle and two universal asynchronous receiver/transmitters to be used simultaneously. The dual universal asynchronous receiver/transmitter (UART) circuit enables simultaneous use of first and second UARTs in conjunction with a 19-pin receptacle and two additional pins. Although the present invention is suitable for a wide scope of applications, it is particularly suitable for simultaneously using a 19-pin receptacle and a dual universal asynchronous receiver/transmitter.

It will be apparent to those skilled in the art that various modifications and variations can be made in the present invention without departing from the spirit or scope of the inventions. For example, other embodiments may be implemented to include more than two UARTs and/or utilize other types of multi-pin receptacles. Thus, it is intended that the present invention covers the modifications and variations of this invention provided they come within the scope of the appended claims and their equivalents.

What is claimed is:

1. A universal asynchronous receiver/transmitter (UART) circuit for a mobile telecommunication terminal, the UART circuit comprising:

a first universal asynchronous receiver/transmitter (UART1) and a second universal asynchronous receiver/transmitter (UART2) coupled to a processor, configured to receive and transmit data between the mobile telecommunication terminal and an external device;

a hands-free functional part coupled to the processor, configured to perform signal processing;

a multiplexer coupled to the hands-free functional part and the second universal asynchronous receiver/transmitter (UART2) at respective receiving and transmitting ends, configured to perform switching operations based on at least one control signal transmitted from the processor; and a multi-pin receptacle coupled to the multiplexer, configured to interface with the external device.

2. The UART circuit according to claim 1, wherein:

the multi-pin receptacle is a 19-pin receptacle.

3. The UART circuit according to claim 1, wherein:

based on the switching operations, a connection between the 19-pin receptacle and the hands-free functional part is established.

4. The UART circuit according to claim 3, wherein:

based on the switching operations, a connection between the 19-pin receptacle and the UART2 is established.

5. The UART circuit according to claim 1, wherein:

based on the switching operations, a connection between the 19-pin receptacle and the UART2 is established.

6. The UART circuit according to claim 1, wherein the multiplexer includes at least two pins to accommodate use by the hands-free functional part and the UART2.

7. The UART circuit according to claim 1, wherein the processor is a mobile station modem (MSM).

8. The UART circuit according to claim 1, wherein the UART1 and the UART2 are located in the processor.

9. The UART circuit according to claim 1, wherein the multiplexer is coupled between the processor and the 19-pin receptacle.

10. The UART circuit according to claim 1, wherein the hands-free functional part is configured to perform signal processing in a hands-free device.

\* \* \* \* \*